March 12, 1963  G. C. BRUMLIK  3,080,662
MOLECULAR MODEL SET

Filed Feb. 2, 1961  3 Sheets-Sheet 1

INVENTOR.
GEORGE C. BRUMLIK
BY
Amster & Levy
ATTORNEYS

FIG. 20.

March 12, 1963 G. C. BRUMLIK 3,080,662
MOLECULAR MODEL SET
Filed Feb. 2, 1961 3 Sheets—Sheet 3
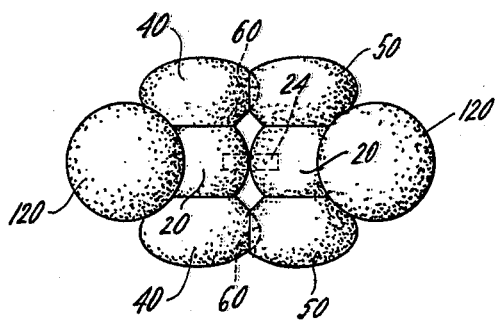
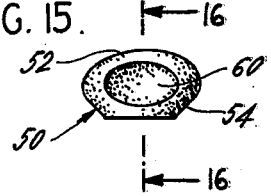
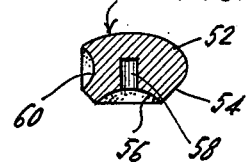
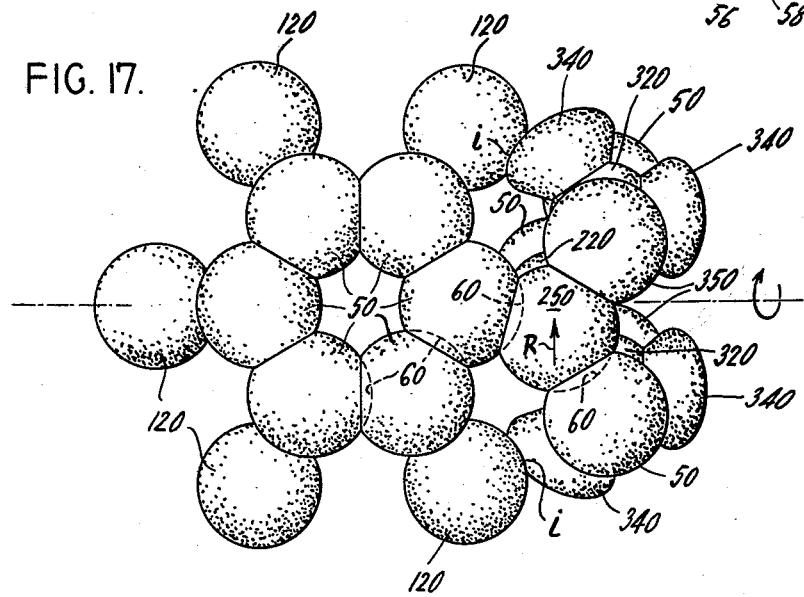
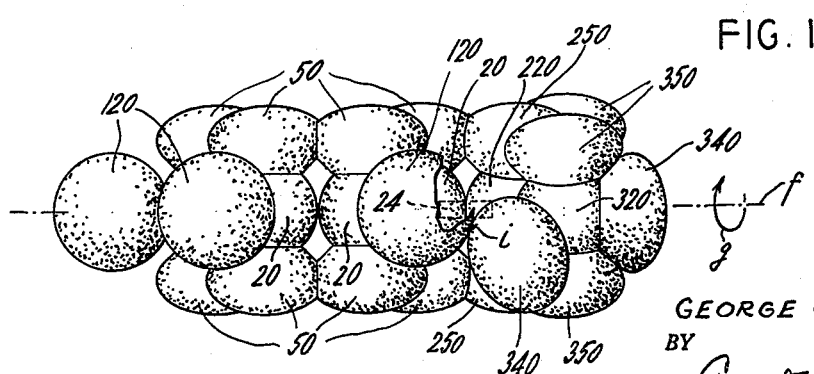
INVENTOR.
GEORGE C. BRUMLIK
BY
ATTORNEYS United States Patent Office 3,080,662
Patented Mar. 12, 1963

3,080,662
MOLECULAR MODEL SET
George C. Brumlik, 331 E. 71st St., New York, N.Y.
Filed Feb. 2, 1961, Ser. No. 86,722
18 Claims. (Cl. 35—18)

The present invention relates generally to models used for representing atoms and molecules, and in particular to a novel and improved model of this type including provision for representation of molecular and atomic orbitals.

Recent development of valence theories and physical molecular investigation have now reached the point where it is possible to consider those features of atomic and molecular orbitals which determine molecular structure and are of importance in chemical reactions. Each particular atom of an element participating in a covalent bond has a fixed covalent radius defining a sphere which can be regarded as the covalent core of the atom, and in addition may have orbital lobes traced by non-bonding valence electron pairs or by electrons that form a molecular $pi$ orbital, e.g., the $s$ and $p$ orbital lobes and their hybrid forms. These valence orbital interact to form the covalent bonds. Either of the $s$ and $p$ orbitals can overlap to form sigma bonds, while the $p$ orbitals can form $pi$ bonds in addition to sigma bonds. Further, the valence electrons which are not used to form bonds are localized and trace orbitals which are known as unshared electron pair orbitals, occupying molecular volume of appreciable magnitude. A fully saturated atom, all the electrons of which are involved in sigma bonds, is substantially spherical in shape, its radius constituting the covalent radius. Sigma bond orbitals are localized between the covalent cores which they connect, and do not project beyond the area of contact between the two bonded atoms so as to increase the volume thereof. Prior art chemical models which represent atoms as one-piece bodies of spherical shape or other shapes are adequate to represent such atoms.

When an atom is unsaturated or has non-bonding valence electrons, electronic orbital lobes are found to rise considerable distances beyond the surface of the covalent core and to assume characteristic shapes, volumes, and spatial orientations. Such lobes may be regarded as a force field defined by the electron density distribution as determined by the wave function whose square is related to the probability of the electron location. These orbital lobes contribute to the atomic volume beyond the volume of the covalent core in the form or protrusions, and may therefore be referred to by the coined term "volume orbitals." Volume orbitals are of two types, one being the unshared electron pair orbitals, and the other type being the molecular $pi$ orbitals. The latter are formed by the overlap of atomic $p$ orbitals, extending over two or more atoms forming a double streamer polynuclear orbital. When it is considered that the distance which a typical volume orbital extends beyond the surface of a covalent core is of the same order of magnitude as the covalent radius of the core, it is readily appreciated that the modern picture of an unsaturated atom is one that cannot be adequately represented by a substantially spherical body or other one-piece body.

Previous chemical models have failed to represent the volume orbitals generally, with the result that important properties of these orbitals have never been adequately depicted in models. The characteristic spatial arrangement of volume orbitals accounts for the distinctive shape and directional character of the various covalent bonds which they form, which in turn determines important physical and chemical properties of the resulting organic radical, molecule or ion. Further, a given unsaturated atom can assume different sizes and shapes when it is in different states of hybridization, that is, when the available quantized energy levels are "distributed" among the orbital electrons in different ways, and it is important to be able to represent these various states.

The modern view of atomic structure recognizes the important difference between the sigma bond and the $pi$ bond. While the sigma bond is localized between two atoms which are bonded together by it, the $pi$ bond consists of two double streamers formed by the overlap of two $p$ atomic orbital lobes which lie above and below the cores of the atoms. This beometry enables the $pi$ bonds to overlap with neighboring $pi$ bonds or unshared pair orbitals to form large polynuclear orbitals. In effect these large double streamer molecular orbitals are formed by the overlap of numerous atomic $p$ orbital lobes. In some cases there are other types of interactions, for example, an inter-orbital repulsion between the nearby orbital lobes of two radicals which are bonded to each other. When this occurs, the resulting steric hindrance may set a definite limit to the relative positions which can be assumed by the two radicals and the resulting molecule may consequently be excluded from certain orientations in space or conformations. Effects such as these which arise from the physical presence and arrangement of the volume orbitals are incapable of representation by present chemical models.

It is broadly an object of this invention to remedy some of the aforesaid deficiencies. In particular, it is an object of the invention to provide a chemical model which is capable of representing the volume orbitals and of demonstrating their spatial arrangements and interactions so as to exemplify the important role which they play in chemical reactions.

These models by being able to depict various types of molecular orbitals, are peculiarly capable of illustrating reactive sites present in the molecule such as acidic and basic sites, sites susceptible of oxidation or reduction, etc. By such representation, predictions can be made as to the course of chemical reactions or the shape and properties of known molecules or even those not yet synthesized.

Another object of the invention is to provide a chemical model of the type described which is capable of representing the greatest number of molecules, radicals and ions with the smallest number of different piece-types, so as to minimize the cost of a model set of any given size.

In accordance with an illustrative embodiment demonstrating these and other features and objects of the invention, there is provided means for forming models ot atoms of such selected forms as found in various molecules, such means including a core body, a lobe body, and means for assembling the core and lobe bodies in position to represent the relative positions of a covalent core and an orbital lobe. Preferably, the core body is substantially spherical to represent the actual shape or a covalent core, while the lobe body is given the actual ellipse-conical shape of an orbital lobe, and the mounting means provides for removable and replaceable assembly of the bodies.

The foregoing brief summary may best be appreciated by reference to the following detailed description, when read in conjunction with the accompanying drawings, wherein:

FIGS. 1, 2 and 3 respectively are perspective views of three different embodiments of a covalent core body employed in the chemical model of this invention;

Figure 12:
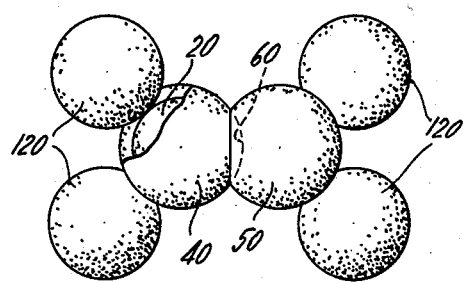
Figure 13:
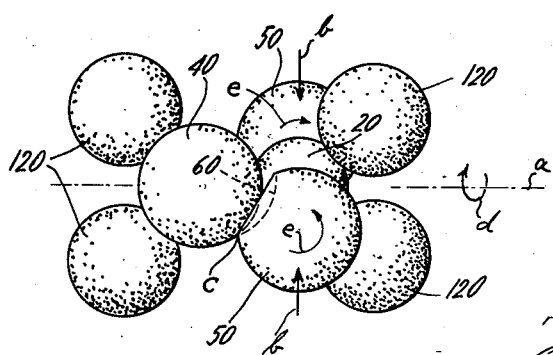
Figure 19:
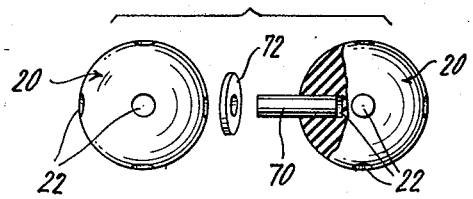

FIGS. 8, 9, 10 and 11 respectively are elevational views of core bodies and lobe bodies assembled therewith to demonstrate the shapes of various hybrid states that an unsaturated atom may assume;

FIG. 12 is a top plan view, with one of the lobe bodies broken away, of a model of an ethylene molecule constructed in accordance with this invention;

FIG. 13 is a top plan view of the model of FIG. 12 with one end of the molecule having been rotated about the carbon-carbon bond to illustrate an excited state of ethylene;

FIG. 14 is a side elevational view of the ethylene model of FIGS. 12 and 13;

FIG. 15 is a side elevational view of another embodiment of an orbital lobe body employed in the ethylene model of FIGS. 12–14;

FIG. 16 is a sectional view taken along the line 16—16 of FIG. 15;

FIG. 17 is a top plan view of a model of a nitrobenzene molecule in accordance with this invention;

FIG. 18 is a side elevational view of the model of FIG. 17, with one of the hydrogen atoms broken away to reveal the core body therebeneath;

FIGURE 19 is a side elevational view of a pair of core bodies, one of which is cut away, showing the use of a smooth cylindrical coupling rod and a spacer washer;

FIGURE 20 is a special fastener which may be used for connecting atoms; and

Figure 21:
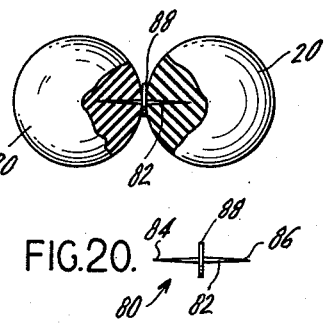

FIGURE 21 illustrates the use of the special fastener of FIGURE 20.

Figure 1:
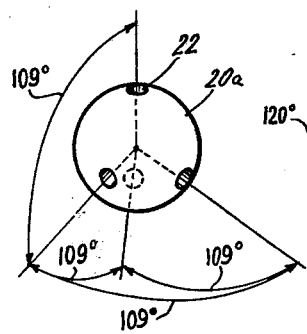
Figure 2:
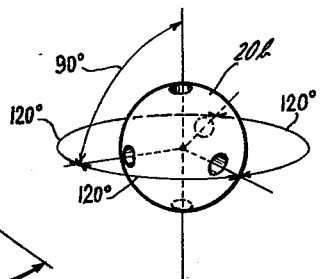
Figure 3:
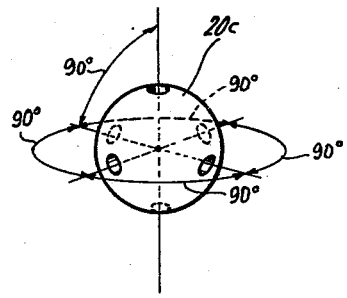

Referring in detail to the drawings, FIGS. 1, 2 and 3 illustrate three different embodiments 20a, 20b and 20c respectively of a covalent core body in accordance with this invention. Each of these is a small sphere formed of plastic elastomer or other suitable material. The core 20a of FIG. 1 has four bores 22 extending radially inward from the surface thereof. These bores 22 may be blind bores, or may meet at the center of core 20a. These bores are distributed over the spherical surface of the core 20a in a tetrahedral pattern; that is, the great circle arc drawn with respect to the spherical surface between the centers of any two of these bores is slightly larger than 109°, as may be seen in FIG. 1. The sphere 20b of FIG. 2 has five bore openings extending inwardly from the surface thereof. The bore openings of the sphere 20b are also arranged in a trigonal bipyramid pattern. Three of the bore openings are spaced triangularly about the horizontal equator of the sphere 20b so that each pair of neighboring bores is separated by a great circle arc of 120°. The other two bore openings are located on a perpendicular axis, that is, at the north and south poles respectively, of the sphere 20b. The sphere 20c of FIG. 3 has six octahedrally arranged bore openings, of which four are equally spaced, i.e. 90° apart, about the horizontal equator of the sphere, while the remaining two bore openings are located at the north and south poles respectively as with the sphere 20b. Thus, the six bore openings are all equally spaced 90° from their neighboring bore openings.

Figure 4:
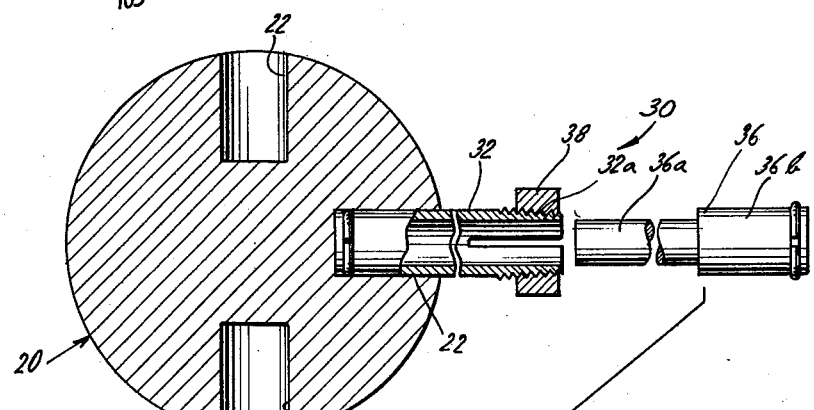
FIG. 4 is an exploded elevational view, on an enlarged scale, of a covalent core body and two different types of coupling rods used for connecting the core body to other core bodies and to orbital lobe bodies; with portions thereof broken away and shown in section to reveal inner constructional detail.

As seen in the greatly enlarged view of FIG. 4, the bores 22 may be of relatively short length, opening through the spherical surface of the core body and extending radially inwardly therefrom but terminating short of the center thereof. It will readily be appreciated that a considerable latitude of choice is available in the construction of the core bodies. For example, the four, five and six bores of core bodies 20a, 20b and 20c respectively can all be formed in a single sphere 20 (FIG. 4) if so desired. In some instances it may be advisable to form bores located diametrically opposite each other on the sphere by simply drilling entirely through the sphere.

The purpose of the bores 22 is to receive one end of a coupling rod such as rod 24, the other end of the coupling rod 24 being inserted into a similar bore formed in another core body 20 or in an orbital lobe body as will subsequently be described. Thus, such coupling rods 24 can be employed in order to assemble two or more bodies in position to represent an atom or a molecule. Coupling rod 24 comprises a short cylinder at least twice the axial length of one of the blind bores 22 of the core body 20. At both ends of the coupling rod 24 are annular ring-receiving sockets 26 extending about the circumference thereof. In the sockets 26 are mounted resilient rings 28 rotatable circumferentially about the rod 24. The ends of rings 28 are slightly spaced apart so that the rings 28 are radially compressible. The sockets 26 are so sized that the rings 28 are radially compressed in the sockets 26 as the ends of the coupling rod 24 are inserted into properly sized bores such as a bore 22. After insertion, the rings 28 resiliently press outwardly against the walls of the bore to make a frictional engagement therewith and thereby retain the rod 24 in the bore. However, the coupling rod 24 remains rotatable relative to rings 28 so as to provide a rotatable connection to the coupled bodies. In the event that the core body 20 and lobe body 40 are themselves made of flexible and resilient material, the coupling rod body 24 can be made of slightly larger diameter than the bores 22 and 48, and the rings 28 and grooves 26 can be omitted.

In some instances it may be desirable to provide a coupling that is adjustable to vary the spacing between the coupled bodies. For this purpose there is provided an adjustable coupling rod 30 which comprises a pair of concentric telescoping sections. The outer section 32 is hollow, and one end of it is split so as to be radially compressible. The inner section 36 has a terminal portion 36a of reduced diameter so as to be received concentrically within the outer section 32. The rear end 36b of the inner section 36 is of normal diameter so as to fit properly within a bore such as bore 22. The split end of section 32 is conically threaded as at 32a, the thread narrowing toward the section 36, and a tightening nut 38 is threaded thereon. The terminal portion 36a of inner section 36 is inserted a selected distance into the split end of outer section 32 and the nut 38 is tightened to compress the split end of section 32 against the terminal portion 36a to secure the section 36 in the desired position of adjustment. It may be desired to calibrate the adjustable coupling 30 in Angstrom units according to a selected scale where great realism of representation is desired.

Figure 5:
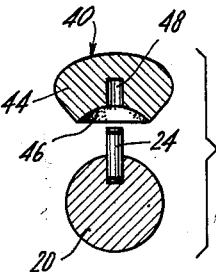
FIG. 5 is a front elevational view of a core body and an orbital lobe body in assembled relationship.

In FIG. 5 a core body 20 is seen in assembled relationship with an orbital lobe body 40. It is thought that the actual geometric shape of an orbital lobe is best represented by an ellipse-conical body. Therefore, the body 40 is provided with a top surface 42 which has the shape of an oblate semi-ellipsoid of revolution. The top surface 42 as seen in the view of FIG. 5 has the profile of an ellipse cut in half along its major axis, and the remainder of the top surface 42 is generated by rotating that profile 90° forwardly and backwardly of the plane of the drawing. Lower portion 44 of the orbital lobe body 40 has the shape of a circular cone which merges with the semi-ellipsoid 42 at its horizontal equator and converges downwardly toward an imaginary vertex located at the center of the spherical core 20.

Figure 7:
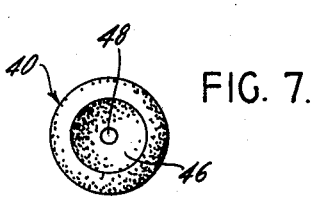
FIG. 7 is a bottom plan view of the lobe body of FIGS. 5 and 6.
Figure 6:
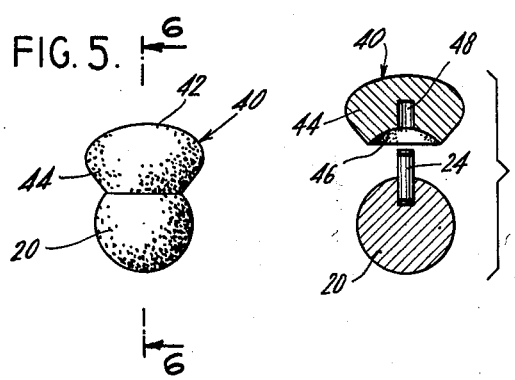
FIG. 6 is an exploded sectional view taken along the line 6—6 of FIG. 5, illustrating the core body, the lobe body, and the coupling rod used for joining the two bodies together.

There is no actual vertex, however, as the orbital lobe body 40 terminates at the surface of the spherical core body 20. As seen in FIGS. 6 and 7, the vertex end of the conical portion 44 is concavely truncated to form a surface 46 preferably of spherical configuration, which conforms to the spherical surface of the core 20. As also seen in these figures, the lobe body 40 is provided with a blind bore 48 of the same diameter as the bores 22 of the core body 20 extending inwardly from the concave surface 46 thereof, thus permitting assembly of the two bodies by means of the coupling rod 24 when the bodies are placed in abutting relation with the bores 22 and 48 in alignment.

With one or more cores 20 having all the necessary bores 22 of FIGS. 1-3 formed therein, it is possible to represent the atomic volume and shape produced by any hybridization state of the $s$ and $p$ quantum shells.

In the $sp^3$ state of ammonia, for example, there are four orbitals occupied by valence electrons. The bonding orbitals are sigma bond orbitals and do not occupy molecular space aside from their effect upon the size of the covalent cores of the atoms. One of the $sp^3$ orbitals is a non-bonding unshared electron pair orbital and this is represented by a lobe body. The shape of the nitrogen atom in ammonia then would be represented by the combination of the core body and an unshared electron lobe body, as illustrated in FIG. 5. In this view, the volume and state of an atom in this state of hybridization is represented with a high degree of accuracy by a core body 20 and a single orbital lobe body 40.

Figure 8:
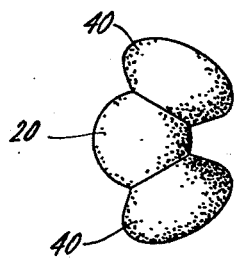

Applying similar considerations to the other $s$-$p$ hybridization states, and making use of the available angles between bores 22, it is possible to represent one of the two other $sp^3$ types of atoms by one core body 20 and a pair of lobe bodies 40 assembled at an angle of 109° as shown in FIG. 8.

Figure 9:
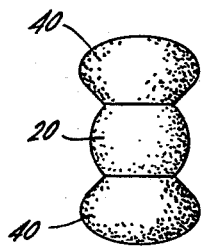

The $sp^2$ lobe body (FIG. 7) assembled with the lobes 180° apart as shown in FIG. 9 represent the one $p$ orbital. Here, strictly speaking, the $p$ orbital is not hybridized and therefore, is represented by two lobes of equal size in contrast to the hybrid orbitals that are represented by a single lobe only such as those represented in FIG. 8. The difference in size of the component lobes is not great, however, and in the interest of representing the greatest variety of atoms with the smallest number of different piece-types, it is preferred to employ the same lobe bodies 40 for all the volume orbitals of the various states of hybridization.

Figure 10:
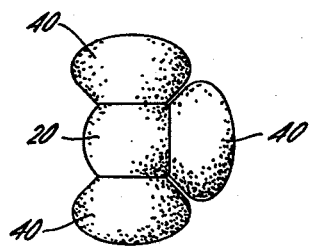

The assembly of FIG. 9 need only be modified by the addition of a third lobe 40 at an angle of 90° to the axis of the other two as seen in FIG. 10 to represent the one $sp^2$ hybridization state of an atom that carries an unshared electron pair orbital (for example the N-atom in pyridene).

Figure 11:
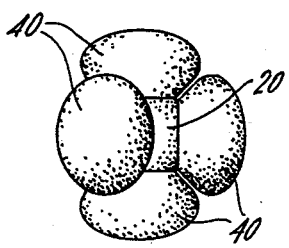

The addition of two lobes at angles of 90° to the two of FIG. 9, the second two being at an angle of 120° to each other, as seen in FIG. 11, represents an atom with one $p$ orbital and two unshared electron pair orbitals, as for example, the oxygen atom in a ketone. Other states of the $s$ and $p$ quantum shells can be similarly represented by various other arrangements of up to six lobes 40 placed about the core 20 according to the available bores 22.

FIGS. 12-17 show the representation of some illustrative organic molecules by models assembled in accordance with this invention. In these figures, identical piece-types which need to be distinguished from each other by virtue of the fact that they represent different molecular entities in the same or different molecules are given reference numerals differing by an increment of some integral multiple of 100.

The relatively simple ethylene molecule is taken as an example of an organic molecule containing a double bond between two carbon atoms in FIGS. 12-14. A pair of core bodies 20, representing the two central carbon atom cores, are assembled by means of a coupling rod 24 as seen in FIG. 14. This coupling rod represents a sigma bond. As best seen in FIG. 12, four additional core bodies 120 are mounted on the bodies 20 by means of coupling rods 24 (not shown). Bodies 120 are mounted in the plane of the bodies 20, and at the proper positions to represent the peripheral hydrogen atom cores. The bores 22 positioned as shown in FIGS. 1-3 are adequate to represent any actual bonding angle between cores which might occur in a wide range of organic substances, thus allowing the model to represent such substances with complete interchangeability. The core bodies 120 representing hydrogen atoms are similar with the core bodies 20 representing carbon, except that they are of larger size, have only one bore, and may be hollowed out at the area in which they abut the adjacent carbon core bodies 20. The various pieces may also be coded with contrasting colors.

The two central carbon atoms of ethylene are double-bonded to each other, and therefore are unsaturated and include volume orbitals in the nature of pi orbitals projecting in each direction perpendicularly to the plane of the molecule. The first bond between the central carbon cores is a sigma bond, and the orbital thereof consequently is not a volume orbital. This sigma bond is thus adequately represented by the coupling rod 24 joining the central carbon core bodies 20. The second bond is a polynuclear $pi$ bond formed by the overlap of adjacent $p$ orbital lobes of the carbon atoms. This $pi$ bond is represented according to this invention by providing in the model a partial overlap of the orbital lobe bodies. In order to represent such polynuclear $pi$ orbitals, another type of orbital lobe body 50 must be used in conjunction with the bodies 40. The orbital lobe body 50 shown in FIGS. 15 and 16 has the same generally ellipse-conical shape including an oblate semi-ellipsoid portion 52 and circular cone portion 54 concavely truncated to form a spherical surface 56 for overlapping the spherical cores 20 and having a coupling rod bore 58 for assembly therewith. But in addition, one side of the lobe body 50 is concavely recessed to form a generally elliptical surface 60 which is adapted to overlap with the convex side surface of an adjacent lobe body 40 or 50. As seen in FIGS. 12 and 14, the adjacent $p$ orbitals on each side of the ethylene molecule which overlap to form a polynuclear $pi$ bond are represented by a pair of adjacent lobes 40 and 50 located above and below the plane of the molecule, portion of the lobes 40, being received within the recesses 60 of the lobes 50 to represent the actual relationship of polynuclear $pi$ orbitals. Coupling rods 24 (not shown) are used to assemble the bodies 50 with the bodies 20. If desired, the orbital lobe bodies 40 and 50 can be color-coded to agree with the color of the particular core body 20 joined thereto, to indicate which cores donated which lobes of the polynuclear $pi$ orbital cloud.

The rotatable connection between the coupling rods 24 and the assembled bodies makes these bodies rotatable relative to each other about the axes of the coupling rods 24 which join them. This permits graphic representation of certain real conditions in the molecular realm. When in an excited state the ethylene molecule may experience a rotation about the carbon-carbon sigma bond, and the polynuclear $pi$ bond may be ruptured. FIG. 13 shows the model in the condition to represent such an excited ethylene molecule. There it is seen that the right hand end of the carbon chain has been rotated relative to the left hand end about the longitudinal axis $a$ of the illustrated carbon-carbon coupling rod 24. The recessed orbital lobe bodies 50 have been rotated about their own coupling rods 24 so as to come out of engagement with the unrecessed lobe bodies 40 as a result of the bodies 50 having been brushed past the bodies 40 during the twisting of the carbon chain. The twisting of the carbon chain represents the rotation of the ethylene molecule about the carbon-carbon sigma bond, and the breaking of the engagement between the recessed lobe bodies 50 and the unrecessed lobe bodies 40 represents the rupture of the polynuclear *pi* bond. The resumption of normal conditions in the molecule when it returns to its ground state may be demonstrated by twisting the carbon chain about the axis back to its original position. As the lobe bodies 40 and 50 come back into a position of alignment, bodies 50 are once again brushed past bodies 40 and consequently forces indicated by the arrows *b* are exerted on bodies 50, these forces having a moment about the points such as *c* where the bodies 50 contact the bodies 40. This moment causes the bodies 50 to rotate back into engagement with the bodies 40, thus representing the resumption of the polynuclear *pi* bond as the carbon chain is twisted back to its normal position. The arrows *d* and *e* show the direction of rotation of the carbon chain and the lobe bodies 50 respectively as the model returns to its original position.

In ethylene the polynuclear *pi* bond associated therewith is rectilinear, i.e., the overlapping orbital lobes thereof are distributed in two streamers, one below, the other above the molecular plane. There are also larger polynuclear *pi* orbitals: I-shaped orbitals involving longer chains of overlapping orbital lobes than the two-lobe chain of ethylene. Such longer chains in many compounds, for example in carbon dioxide and carbon suboxide. A model set according to this invention can easily represent an I-shaped orbital of any length by a construction similar to the ethylene model of FIGS. 12–14 by simply using longer rows of serially meshing lobe bodies 50, terminating at one end of the row in an unrecessed lobe body 40.

In addition, there are many other more complex configurations which polynuclear *pi* bonds assume in nature, and which can be represented in accordance with this invention. There are, for example, curvilinear *pi* orbitals, and branched chain *pi* orbitals some of which resemble in their form some letters of the alphabet for example, the letters C, O, U, Y. The model set of this invention, because the coupling rods 24 allow rotation of an orbital lobe body 50 relative to the core body 20 with which it is assembled, permits the representation of all these complex orbitals by the simple expedient of turning each recessed lobe body 50 so that the recess 60 thereof faces in the proper direction.

As an example both of a curvilinear *pi* orbital, there is illustrated in FIGS. 17 and 18 a model of a nitrobenzene molecule. This aromatic compound is derived from benzene in which a hydrogen atom was replaced by a nitro group radical (—$NO_2$). The phenyl radical ($C_6H_5$), i.e., the benzene molecule minus the replaced hydrogen atom is at the left hand end of the molecule and is represented by a closed planar ring of six cores 20 (not all shown) joined by sigma-bond-representing coupling rods 24 (not shown) to represent the carbon ring which is characteristic of the aromatic compounds. An outer group of five cores 120 are mounted in the plane of the bodies 20 and are joined respectively to five of the six bodies 20 by sigma-bond-representing coupling rods 24 (not shown) to represent the five remaining unsubstituted hydrogen atoms. The nitro group radical is at the right hand end of the molecule and includes a nitrogen atom core body 220 coupled to the hydrogen-lacking core body 20 of the ring structure by a sigma-bond-representing coupling rod 24 to represent the covalent core of the nitrogen atom. A pair of cores 320 projecting from the nitrogen-representing core 220 are joined thereto by sigma-bond-representing coupling rods 24 (not shown) to represent the covalent core of the oxygen atoms.

There is a complex polynuclear pi orbital which includes a double streamer O-shaped orbital associated with the benzene ring and a C-shaped double streamer orbital formed by the orbital lobes of the nitro group. These two polynuclear orbitals overlap to form a larger polynuclear orbital that encompasses both the benzene ring and the nitro group. To represent this feature of the molecule, a circle of lobe bodies 50 is assembled on each side of the ring-representing structure, projecting perpendicularly from the plane thereof. Using coupling rods 24 (not shown), one body 50 is assembled on each side of each body 20 in the ring. In addition, the bodies 50 are turned so the recess 60 of each body 50 receives one side of one adjacent body 50, as in part illustrated in FIG. 17, so as to form a closed circle of serially meshed bodies 50 on each side of the ring to represent the polynuclear O-shaped orbital. It will readily be appreciated from this how other curvilinear orbitals such as the C-shaped and U-shaped variety can similarly be assembled.

Indicating orbital lobe bodies by reference numerals in the same hundreds series as the reference numerals of the core bodies with which they are associated, the nitrogen-representing and oxygen-representing core bodies 220 and 320 respectively are assembled by means of coupling rods 24 (not shown) with orbital lobe bodies 250 and 350 respectively projecting perpendicularly from the plane of the core bodies 220 and 320 on both sides thereof. The bodies 250 are turned to receive the nearest bodies 50 within the recesses 60 thereof, and in turn are received within the recesses 60 of the nearest bodies 350 to represent a C-shaped orbital merged into the O-shaped orbital on either side of the molecule. Thus, it will be appreciated that any sort of branching or curvilinear structure may be represented by a similar arrangement of pieces according to this invention.

In addition to the described polynuclear orbitals, the nitro radical includes four *p* orbital lobes associated solely with the oxygen atom cores. To represent these, unrecessed lobe bodies 340 are assembled with the oxygen-representing core bodies 320, so that each core body 320 has one lobe body 340 extending forwardly therefrom away from the phenyl radical and one lobe body 340 extending rearwardly therefrom toward the phenyl radical.

The nitro benzene molecule is another example of a molecule which may experience rotation and a concurrent rupture of a polynuclear pi bond orbital. Rotation of the nitro radical about the carbon-nitrogen sigma bond occurs, and disrupts the connection between the branched and circular portions of the polynuclear *pi* orbital. The model of FIGS. 17 and 18 represents this phenomenon in the manner explained in connection with the ethylene model of FIGS. 12–14. Briefly, rotation of the nitro group-representing part of the model about the axis *f* of the illustrated carbon-nitrogen coupling rod 24 brushes the lobe bodies 250 past the contiguous lobe bodies 50 and consequently rotates the bodies 250 about their own coupling rods 24 out of engagement with the bodies 50. Such rotation of the bodies 250, however, does not have any effect on their engagement with the lobe bodies 350 since the bodies 250 merely rotate in the recesses 60 thereof. In addition, the bodies 50 nearest the nitro radical are locked together and thus prevent rotation of any of them out of mutual engagement. Thus, the model accurately represents the fact that mutual rotation of the radicals disturbs only the *pi* bonding between the radicals and does not disrupt the *pi* bonds within either radical.

Rotation of the nitro group radical back in the direction indicated by arrow *g* serves to brush the bodies 250 past the contiguous bodies 50 in the opposite direction so that a force indicated by the arrow *h* is exerted to rotate the bodies 250 back into engagement as was explained in connection with the ethylene model of FIGS. 12–14.

The rotation of the nitro group radical in the direction indicated by the arrow *g* can proceed far enough to cause the bodies 250 and 50 to mesh almost completely, but cannot freely proceed far enough to rotate the plane of the nitrogen- and oxygen-representing cores 220 and 320 into coincidence with the plane of the carbon- and hydrogen-representing core bodies 20 and 120. This is because the rearwardly projecting lobe bodies 340 at the top and bottom of the model abut against the forwardly projecting hydrogen-representing core bodies 120 adjacent thereto at points *i* to prevent complete alignment. This represents another actual feature of the nitro benzene molecule, in which the minimum energy state is associated with an irreduceable minimum angular displacement between the nitro group and phenyl radicals owing to steric hindrance between certain of the hydrogen atom cores and certain of the *p* orbital lobes associated with the oxygen atoms as represented by the model.

Many compounds, such as those of the alkyne or alkene series, include triple bonds which comprise two *pi* bonds in addition to the sigma bond, wtih the orbital lobes of the two *pi* bonds arranged in mutually perpendicular planes. This model set can also easily represent a triple bond by simply assembling two sets of meshing orbital lobe bodies in mutually perpendicular planes. The core bodies 20 provide the necessary bores 22 properly positioned for such an assembly.

This model set is also capable of representing a type of single bond known as a "*pi* only bond." This bond, which occurs in the compound $N_2O_4$, is a pi bond formed by the overlapping of *p* orbitals of the nitrogen atoms as in an ordinary double or triple bond, but in which the covalent cores associated with these orbitals are not sigma bonded. Such a bond can be represented by simple omitting the coupling rod 24 between the core bodies 20 to represent the absence of the sigma bond, and providing some alternative means of holding together the two assemblies of the respective core bodies 20 and their associated lobe bodies 40 and 50. One alternative is to provide the necessary bores on the contiguous surfaces of each of the meshing lobe bodies 40 and 50 to enable them to be secured together with a coupling rod 24. Another way is to make the lobe bodies 40 and 50 adhere to each other by the use of electrets or embedded magnets. Such a construction would not permit rotation of the assemblies without breaking the connection between them, thus accurately representing the fact that rupture by rotation of a hollow *pi* bond entirely destroys the chemical combination between radicals so bonded, there being no central sigma bond present which can survive rotation without rupture.

It will be appreciated that a special advantage can be achieved by the preferential use of elastomeric materials in the models shown herein. The individual model parts can be made of various elastomeric material differing in degrees of hardness, elasticity, etc. These elastomeric materials can be selected to represent in the models the bending constants of the valence angles of the molecules, and to reflect the compressibility of Van Der Waals radii.

Employing elastomeric materials also permits the use of straight smooth rods as coupling means. Short rods may be used to produce spice-filling molecular orbital models, and long rods may be employed to produce models of the ball-and-stick variety.

Where the core bodies are made of elastomeric material, smooth cylindrical coupling rods can be inserted to a desired depth within the bores of said core bodies, and will be frictionally retained therein. In this case, the distance between the atoms in the model of the molecule can be accurately controlled by insertion of washers upon the coupling rod. FIG. 19 shows a pair of core bodies 20 made of elastomeric material and a smooth cylindrical coupling rod 70 which may be employed to join the core bodies 20 by inserting its ends in the core body bores 22. This view also illustrates a washer 72 which is sized to be mounted on the coupling rod 70 to act as a spacer between the core bodies 20. Such washers 72 can be made in thicknesses corresponding to fractions of Angstrom units. For example, each washer 72 can be made in a thickness of .05 Angstrom unit and the correct number of washers employed to accurately space the core bodies. There is no model assembly presently known in which so accurate a control over interatomic distances can be achieved.

The use of suitable elastomers also permits facile manual rotation around single bonds, but prevents accidental rotation. This feature makes it possible to construct and examine models of molecules in their various conformations in space.

Where elastomeric materials are used, FIGS. 20 and 21 show a special fastener which may be employed for connecting atoms in the molecular models in order to represent nonclassical intermediates such as three center bonds and other non-standard chemical species. These fasteners are also intended for use in the joining of atoms and molecules to depict the pattern of crystals, or in any relative orientation of the units of a crystal or any other assembly in space. The fastener 80 is in the form of a pin having a shank 82 which is pointed at each end as represented by reference numerals 84 and 86. At the center of shank 82, a flat body 88 is secured perpendicularly to the axis of said shank. While the body 88 is shown in the drawing in the form of a flat circular disc, it may be made of any suitable shape, such as hexagonal, lens-shaped, etc.

In use, one pointed end of the pin shank 82 can pierce a core body 20 at any location thereon, and the opposite point can pierce another core body. FIG. 21 shows a pair of core bodies 20 joined in this manner by the fastener 80. The flat body 88 may be employed as a finger grip to aid in withdrawing the fastener from the core body. In addition, the joint effected by the flat body 88 can bear a great load and the penetration of the elastomer part by the pin point does not result in a visible hole or apparent damage to the core body. The use of such fastener elements 80 permits the joining of molecular models of parts thereof at any point and at any desired angle or orientation in space, without the need of drilling permanent holes for the purpose in the core bodies, and without scarring or other damage.

It will be appreciated that where smooth cylindrical coupling rods are employed to join core bodies made of elastomeric material, these coupling rods can be made with central flat bodies similar to the flat body 88 shown in FIG. 20, to permit the coupling rod to be withdrawn against the frictional resistance of the elastomeric core body. The coupling rod can also be made in the form of cylindrical rod projecting from one side of the flat body and a pointed pin projecting from the other side thereof.

It will therefore be appreciated that a model set in accordance with this invention, provides for the representation of the volume-occupying lobes of various orbital electrons. It, therefore, succeeds in accurately representing a host of related natural phenomena occuring on the molecular and atomic levels, and does so in connection with a wide range of molecules, yet requires a minimal number of different piece-types and is therefore relatively inexpensive to manufacture.

While preferred embodiments of the invention have been shown and described herein, it is obvious that numerous additions, changes and omissions may be made in said invention without departing from the spirit and scope thereof.

What I claim is:

1. A model assembly for representing the atomic and molecular orbital structure of atoms in a molecule, said assembly comprising at least one body representing the atom core, at least one body shaped to represent the three dimensional character of an atomic orbital, and means for selectively connecting said bodies to depict an atom having at least one unshared electron pair orbital.

2. A model assembly for representing the atomic and molecular orbital structure of atoms in a molecule, said assembly comprising a plurality of separate spherical bodies representing atom cores, a plurality of separate bodies shaped to represent the three dimensional character of atomic orbitals, means for selectively connecting said atom core bodies to each other, and means for selectively connecting said orbital bodies to the respective core bodies to depict a molecule composed of atoms having unshared electron pair orbitals.

3. A model assembly for representing the atomic and molecular orbital structure of atoms in a molecule, said assembly comprising a plurality of bodies representing atom cores, a plurality of bodies representing atomic orbitals, means for selectively connecting said core bodies, and means for selectively connecting said orbital bodies to the respective core bodies, said orbital body of one atom core being shaped to partially overlap the orbital body of an adjacent atom core when said orbital bodies are connected to said core bodies to depict a molecule having at least one *pi* bond molecular orbital, and to prevent rotation between said core bodies.

4. A model assembly according to claim 3 in which one of said orbital bodies has a concavity formed therein for receiving the edge portion of another orbital body to produce said overlapping of the orbital bodies.

5. A model assembly for representing the atomic and molecular orbital structure of atoms in a molecule, said assembly comprising at least one substantially spherical body representing the atom core, at least one substantially ellipsoconical body representing an atomic orbital, and means for removably and replaceably connecting said bodies to depict an atom having at least one unshared electron pair orbital.

6. A model assembly according to claim 5 in which said conically-shaped orbital body narrows toward said core body.

7. A model assembly according to claim 6 in which the vertex end of the conically-shaped orbital body is concavely truncated to mesh with said core body.

8. A model assembly for representing the atomic and molecular orbital structure of atoms in a molecule, said assembly comprising at least one body representing the atom core, at least one body shaped to represent the three dimensional character of an atomic orbital, and means for selectively connecting said bodies to depict an atom having at least one unshared electron pair orbital, said connecting means including means on said core body arranged for mounting said orbital body thereon at locations distributed over the surface thereof in a regular pattern corresponding to at least one selected hybridization state.

9. A chemical model comprising a pair of core bodies, a pair of lobe bodies, and means for removably and replaceably asembling said core bodies in side-by-side relationship and for assembling said lobe bodies in contiguous relationship to each other on respective core bodies including means on one of said core bodies arranged for mounting the other core body thereon at locations distributed over the surface thereof, one lobe body adapted to be mounted on said one core body being concavely recessed on the side thereof contiguous to the other lobe body to mesh with said other lobe body, said assembly means being constructed to permit rotation of said recessed lobe body relative to said one core body whereby to permit said recess to face in different directions to mesh with said other lobe body in various positions of said other lobe body and said other core body relative to said one core body.

10. A chemical model comprising a pair of core bodies, a pair of lobe bodies and means for removably and replaceably assembling said core bodies in side-by-side relationship and for assembling said lobe bodies in contiguous relationship to each other on respective core bodies including means on one of said core bodies arranged for mounting the other core body thereon at locations distributed over the surface thereof, one lobe body adapted to be mounted on said one core body being concavely recessed on the side thereof contiguous to the other lobe body to mesh with said other lobe body, said assembly means being constructed to permit rotation of said recessed lobe body relative to said one core body whereby to permit said recess to face in different directions to mesh with said other lobe body in various positions thereof of said other lobe body and said other core body relative to said one core body, said assembly means being constructed to permit rotation of said core bodies relative to each other whereby such rotation produces rotation of said lobe bodies relative to each other to make and break the engagement therebetween.

11. A chemical model according to claim 10 wherein said assembly means comprises bores formed in said core bodies and in said lobe bodies and coupling rods having opposite ends engageable in the respective bores of said bodies to secure the latter together.

12. A chemical model according to claim 11 wherein said coupling rod ends are each formed with an annular ring-retaining socket, radially compressible rings being rotatably mounted in said sockets to make frictional, rotatable engagement between said coupling rod ends and said bores.

13. A chemical model according to claim 11 wherein said coupling rod comprises a pair of telescoping sections adjustable to vary the spacing between said bodies.

14. A chemical model according to claim 13 wherein said telescoping sections are in concentric relationship, the outer section being split at one end for radial compressibility, a locking member being engageable about said split end to compress the same against the inner section to lock said coupling rod in a given position of adjustment.

15. A chemical model comprising a pair of substantially spherical core bodies, means for assembling said core bodies in side-by-side relationship, a pair of substantially ellipsoconical lobe bodies, and means for mounting said lobe bodies in contiguous relationship to each other on respective core bodies with the conically shaped portions of said lobe bodies narrowing toward said respective core bodies, the vertex end of the conically shaped portions of said lobe bodies being concavely truncated to mesh with said respective core bodies, the side of one of said lobe bodies contiguous to the other lobe body being concavely recessed to mesh with said other lobe body.

16. A chemical model comprising a pair of assemblies respectively representing a pair of radicals, and means joining said assemblies to represent a bond between said radicals and permitting relative rotation thereof, one assembly including at least one lobe body positioned in relation thereto to represent an orbital lobe projecting therefrom and the other assembly including at least one other body projecting therefrom in such manner that said bodies are interposed in each other's paths to limit relative rotation of said assemblies and thereby represent steric hindrance.

17. A model assembly for representing the atomic and molecular orbital structure of atoms in a molecule, said assembly comprising a plurality of elastomeric bodies respectively shaped to represent the three dimensional characteristics of atom cores and atomic orbitals, at least one radial bore in each of said bodies, an elongated coupling rod for said bodies, the opposite ends of said rod being sized to fit within the respective bores of said bodies and being of slightly greater diameter than the diameter of said bores and having a tight friction fit with the elastomeric walls of said bores, whereby to provide a strong yet detachable link betwen said bodies.

18. A model assembly for representing the atomic and molecular orbital structure of atoms in a molecule, said assembly comprising at least a pair of elastomeric bodies representing atom cores, at least one elastomeric body representing an atomic orbital for each core, means for selectively connecting said orbital bodies to said lobe bodies for forming models of atoms, and means for selectively connecting said atoms together at any selected points thereon and at any desired angular relationship to depict molecular structures of non-standard geometric arrangement and to join molecular assemblies into selected crystal patterns, said connecting means comprising an elongated pin having opposed pointed ends for piercing and entering said elastomeric bodies, and a spacer element affixed to the center of said pin for limiting the penetration of said pointed ends within the respective bodies.

References Cited in the file of this patent

UNITED STATES PATENTS

| | | |
|---|---|---|
| 2,052,457 | French | Aug. 25, 1936 |
| 2,942,357 | Adler | June 28, 1960 |

OTHER REFERENCES

Corey et al.: The Review of Scientific Instruments, vol. 24, No. 8, pp. 621–627, August 1953.